United States Patent Office 3,410,373
Patented Nov. 12, 1968

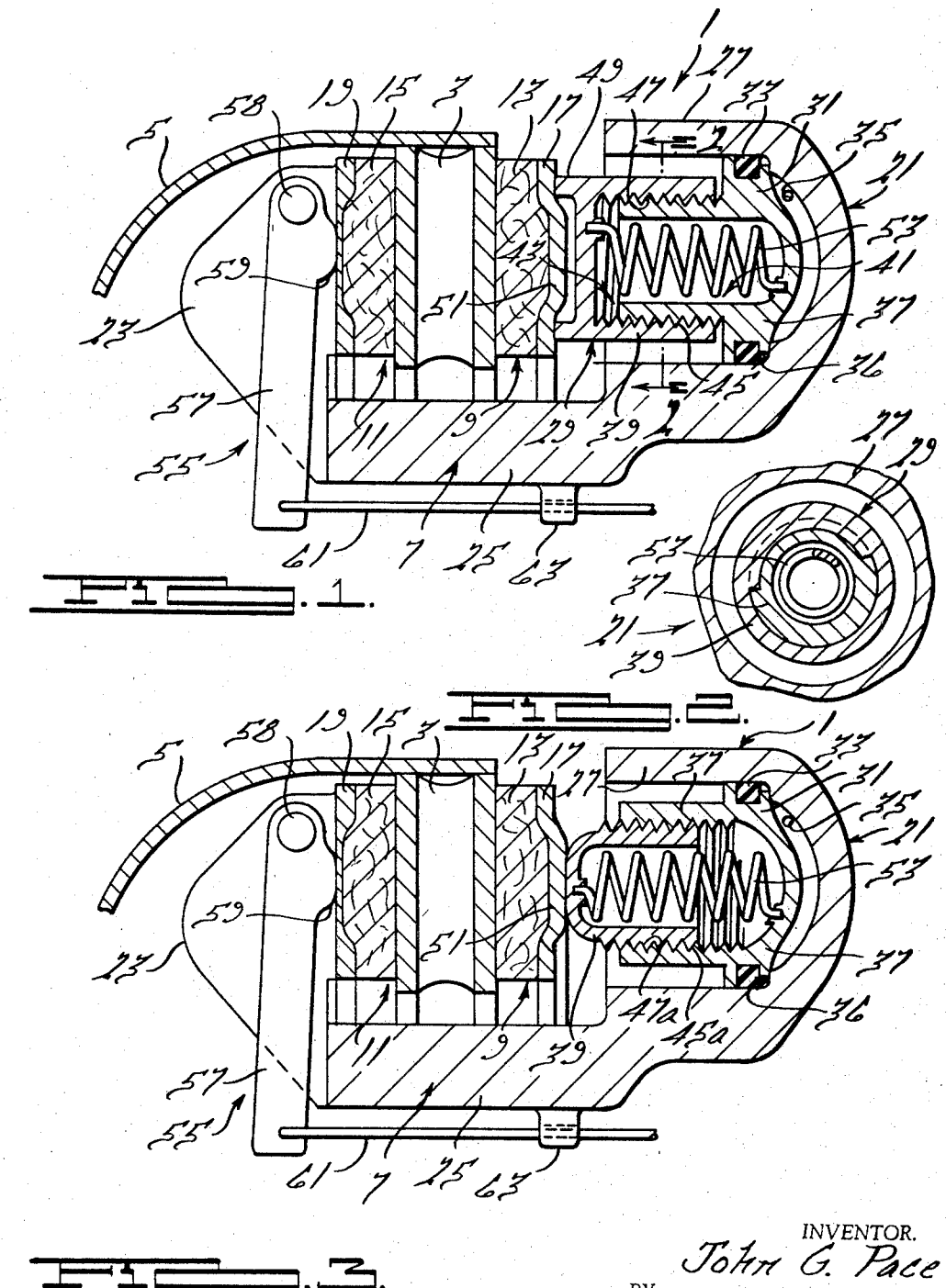

3,410,373
TORSION SPRING-OPERATED DISC BRAKE ADJUSTER
John G. Pace, Detroit, Mich., assignor to Chrysler Corporation, Highland Park, Mich., a corporation of Delaware
Filed Nov. 10, 1966, Ser. No. 593,424
4 Claims. (Cl. 188—196)

ABSTRACT OF THE DISCLOSURE

A disc brake mechanism including a cylinder and piston arrangement for actuating one brake shoe member against the rotatable disc. The piston is extensible and includes first and second threaded members having a threaded connection therebetween. A torsion spring is located inside both threaded members and is adapted to cause rotation of one threaded member relative to the other to extend the length of the piston and maintain the brake shoe member in close proximity to the rotatable disc.

---

This invention relates to brake adjusting devices, and more particularly to a device for automatically adjusting disc brakes in response to brake lining wear.

It is advisable to keep the brake linings of disc brakes in close proximity to the disc as the lining wear, i.e., as the thickness of the linings decreases, so that, when the brake pedal is depressed, the hyddaulic fluid immediately forces the linings into contact with the disc. If some means were not employed for maintaining the linings close to the disc as the lining wear, the actuating piston or pistons to which the linings are conected might be retracted into their respective cylinders when the brake pedal is released. Moreover, during hard cornering of the automobile, or when an obstacle, such as a curb, is hit by a wheel, the pistons in the disc brakes might be jarred back into their respective cylinders, thus pulling away or allowing the brake shoes to pull away the linings from adjacent the disc. This is often referred to as piston kickback. When the brake pedal would be depressed after the brake pistons had moved back into their respective cylinders, a substantial portion of the pedal movement would be utilized just to move the pistons out of the cylinders toward the linings before the linings were forced into contact with the disc. This excess piston movement increases as the linings wear.

There are many known arrangements for preventing piston kickback and for maintaining the brake linings in close proximity to or even in slight contact with the disc. The known arrangements usually include an adjustable stop member frictionally engaging a surface in such a manner that movement of the piston in a direction toward the brake shoe is allowed, while return movement of the piston is limited to a short distance. Normally, a spring having a relatively constant spring force is employed to aid the return of the piston the short distance. The stop is sometimes mounted in the known arrangements along a bolt located in the cylinder space or in contact with the cylinder walls. While the known arrangements satisfactorily perform their intended function, they are often relatively complicated in design.

One of the primary objects of this invention is to provide a device for automatically adjusting disc brakes which is adapted to operate in response to brake lining wear to maintain the linings in light contact with the disc, thereby enabling the linings to grip the disc immediately upon brake pedal depression.

Another object of the present invention is to provide an automatic disc brake adjuster of the type described which does not rely on any frictional contact with the cylinder for preventing return movement of the piston.

A further object of this invention is to provide an automatic disc brake adjuster such as described which is particularly adapted for disc brakes having a mechanical actuation system as well as a hydraulic actuation system.

Still another object of this invention is to provide an automatic disc brake adjuster of the class described which will not over adjust when the caliper deflects or opens due to hydraulic actuation of the piston.

Another object of this invention is to provide an automatic disc brake adjuster of the type described which is economical in construction and reliable in operation.

Other objects and features of this invention will be made apparent as the description progresses.

In the accompanying drawings, in which two of various possible embodiments of this invention are illustrated:

FIG. 1 is a sectional view of one embodiment of this invention;

FIG. 2 is a section taken along line 2—2 of FIG. 1; and

FIG. 3 is a sectional view of a second embodiment of this invention.

Like parts are indicated by corresponding reference characters through the several views of the drawings.

Referring now to the drawings, a disc brake mechanism is generally indicated at 1. It includes a rotatable annular disc member 3, the outer periphery of which is attached to a disc support 5 by suitable means (not shown). Support 5 is connected to the wheel and rotates therewith. A caliper body or actuating means 7 is slidably connected to a fixed frame by any suitable means. The caliper is adapted to slide back and forth substantially parallel to the axis of the wheel.

Two brake lining members 9 and 11 are located on opposite sides of disc 3. The members 9 and 11 comprise pads 13 and 15 connected to shoes 17 and 19, respectively, which are mounted, by means not shown, for movement toward and away from disc 3.

Caliper 7 has two end portions 21 and 23, on opposite sides of disc 3 outside lining members 17 and 19, interconnected by a central web 25 which internally straddles the disc. Portion 21 is hollow and has a cylindrical section 27 opening toward the disc member 3. Mounted within cylinder 27 is a piston 29 having an annular peripheral double flange portion 31 in sliding contact with the cylinder wall. A suitable annular seal 33 lies between the two flanges of portion 31 and contacts the cylinder wall to prevent the egress of hydraulic fluid from the cylinder. Hydraulic fluid under pressure is delivered to the cylinder through a port 35 from a pressure source, such as a master cylinder. Piston 29, in its rearmost position, is adapted to engage a seat 36 formed in cylinder 27.

Piston 29 is formed of two cylindrical members 37 and 39 having cavities 41 and 43, respectively, therein. Member 37, in the embodiment shown in FIGS. 1 and 2, is provided with an external thread 45 which is in threaded engagement with an internal thread 47 on member 39. The outer end of member 39 is formed as an annular ring 49 which engages the back of brake shoe 17 and surrounds a circular raised portion 51 on the shoe. It will be seen that the threaded connection between members 37 and 39 makes the piston 29 extensible, i.e., the length of the piston may be increased by rotating one member relative to the other in one direction.

A torsion spring 53, having its opposite ends engaged with members 37 and 39, respectively, exerts a force on the members which tends to rotate them in opposite directions, relative to one another, for unscrewing one member relative to the other and causing the length of the piston 29 to be increased. The spring is designed to exert a relatively constant force on the members as it unwinds. The threads 45 and 47 are self-locking to prevent shortening of the piston when an axial load larger than a predetermined amount is placed on the piston. In a manner to be described hereinafter, pads 13 and 15 are adapted to be moved into braking contact with disc 3 when hydraulic fluid under pressure is forced into cylinder 21 through port 35.

A hand or emergency braking mechanism mechanically operated is generally indicated at 55. It includes a lever 57 pivotally connected at 58 to end portion 23 of caliper 7. A cam 59 is formed on lever 57 and engages the back surface of brake shoe 19. The lever 57 is adapted to be swung counterclockwise as viewed in FIG. 1 by a manually controlled cable 61 connected to the outer end of the lever and extending through a guide 63 on caliper 7 to suitable tension applying mechanism (not shown). As explained hereinafter, the linings on pads 13 and 15 are adapted to move into braking contact with the disc 3 when the lever 57 is swung counterclockwise.

Assuming the various parts of the brake are in the position shown in FIG. 1, operation thereof is as follows:

First, to assume the position shown in FIG. 1, the spring 53 had to rotate the piston members 37 and 39 relative to one another until the annular ring 49 on member 39 has pushed the lining member 9 into light contact with one side of the disc, and the flange 31 had seated in seat 36 and forced caliper 7 to the right (as viewed in FIG. 1) until lining member 11 is in light contact with the other side of the disc. It is desirable to have the lining members in light contact with the disc so that they will not have to be moved before applying a braking force when the brake pedal is depressed. The spring 53 causes the linings to be forced into such light contact with the disc. However, the resistance to further lining movement offered by the disc is sufficient to overcome the force exerted by the spring 53. Accordingly, the linings do not engage the disc with sufficient drag to effect braking.

The linings 9 and 11 are forced into braking contact with the disc by depressing the brake pedal and causing hydraulic fluid to be admitted to the cylinder 21 behind the piston 29. This causes the piston to be moved to the left and the caliper 7 to be moved to the right as viewed in FIG. 1, thereby forcing the linings 9 and 11 into braking contact with the disc. The axial load exerted on the piston 29 during hydraulically powered braking locks the threads 45 and 47 against relative rotation and thus prevents any shortening of the piston.

The end portions 21 and 23 may deflect and spread apart slightly during brake application due to the forces exerted on the caliper. However, upon brake pedal release, the pistons 29 and caliper 7 return to a position wherein flange 31 is located in seat 36, without spring 53 causing any increase in the length of the piston 29 if the pads 13 and 15 have not worn during the brake application. This is because the axial load on the piston exerted by shoe 17 and seat 36 has not decreased below that load which existed prior to brake application. However, if the pads 13 and 15 did wear slightly during the brake application, they would be slightly thinner than they were before brake application, thereby leaving a slight clearance upon brake pedal release. This slight clearance relieves the axial load on the piston 29 and the spring 53 causes the members 37 and 39 to rotate slightly relative to one another, i.e., the spring unscrews one member from the other, thereby increasing the length of the piston. As the piston increases in length, it first engages seat 36. Further expansion of the piston causes the linings 9 and 11 to push toward disc 3 until light contact therewith is made. At this point the axial load on the piston is large enough to overcome the force exerted on the members 37 and 39 by the spring 53, and further extension of the piston 29 is stopped.

If the hand or emergency brake mechanism 55 is operated, the lever 57 moves counterclockwise as viewed in FIG. 1 under the bias of cable 61. As the lever pivots, cam 59 pushes brake lining member 11 to the right into braking contact with the disc, while the pivotal connection 58 pushes the caliper 7 to the left. As the caliper 7 moves to the left, seat 36 forces piston 29 and brake lining member 9 to the left until lining member 9 is pressed into braking contact with the disc. It will be understood that the movements of lining members 9 and 11 are moved into braking contact with the disc substantially simultaneously. The axial load on piston 29 during brake application prevents relative rotation movement of the members 37 and 39, and hence lengthwise adjustment, of the piston. Adjustment of the pads 13 and 15, if they should wear during application of the hand brake mechanism, is accomplished in the same manner as described above. However, since the hand brake is usually applied when the vehicle is stopped, it is unlikely that the pads will be worn during hand brake application.

It will be seen that the adjustment device of this invention functions effectively to maintain the brake lining member close to the disc in response to wear on the linings. Over adjustment of the mechanism is avoided by the threaded connection between the members 37 and 39, which locks up and overcomes the unscrewing force exerted by spring 53. The adjuster is particularly applicable to disc brake structures having a separate mechanically operated hand brake system. Since the flange 31 on member 37 seats on seat 36, the rigidity of the caliper 7 is utilized to move the piston 29 to the left as viewed in FIG. 1, thus assuring good hand braking action.

A second embodiment of this invention is illustrated in FIG. 3. This embodiment is substantially identical to the first embodiment, the difference between the two embodiments being in the threaded connection between the members 37 and 39 of piston 29. The member 37 surrounds member 39 and the threads on member 37 are internal as indicated at 45a. Threads 45a are threaded on threads 47a located externally on member 39. The operation of the embodiment shown in FIG. 3 is the same as the embodiment shown in FIG. 1.

It will be noted that the present device will not over adjust even if the caliper deflects during brake application. This is in contrast to some types of adjusters relying on friction between two parts for holding the piston in an advanced position as the brake pads wear. The latter type of adjusters usually require a clearance to permit the piston to backoff a short distance after the caliper, which deflects during brake application, returns to its normal position.

In view of the foregoing, it will be seen that the several objects and other advantages of this invention are attained.

It will be understood that the invention is not to be limited to the exact constructions shown and described, but that various changes and modifications may be made without departing from the spirit and scope of the invention, as defined in the appended claims.

I claim:

1. In a brake mechanism, a rotatable disc member, actuating means having portions on opposite sides of said disc member, brake lining means on opposite sides of said disc member between the latter and the respective portion of said actuating means, said actuating means including extensible means for engaging said brake lining means on one side of said disc member and adapted to move said brake lining means into braking contact with said disc member, means for automatically extending said extensible means in response to wear on said brake lining means to maintain the latter close to said disc member, said extensible means comprising first and second threaded members having a threaded connection therebetween, the length of said extensible means being increased upon the rotation of one of said threaded members relative to the other in one direction, said means for automatically extending said extensible means comprising resilient means adapted to cause rotation of said one member relative to the other in said one direction, said first and second threaded members being hollow, said means for automatically extending said extensible means comprising a torsion spring inside said threaded members relative to the other in said one direction, one of said threaded members having an external thread and the other having an internal thread, the portion of said actuating means on the same side of said disc member as said extensible means including a cylinder, said extensible means forming a piston in said cylinder, one of said threaded members being in sealing engagement with the cylinder wall, and port means formed in said cylinder to admit hydraulic fluid for forcing said piston toward said disc member relative to said cylinder, said extensible means being held inextensible against the bias of said torsion spring when hydraulic fluid under pressure is admitted to said cylinder upon actuation of a brake pedal controlling operation of said brake mechanism.

2. In a brake mechanism as set forth in claim 1 further comprising mechanically operated means for forcing said lining means into braking contact with said disc member, said extensible means being seated in said cylinder and held inextensible upon actuation of said mechanically operated means.

3. A device for automatically maintaining brake lining means adjacent a rotatable disc comprising a cylinder fixed against rotation, an extensible piston in said cylinder adapted upon outward movement relative to said cylinder to force said brake lining means toward said rotatable disc, and means for increasing the length of said piston in response to wear of said brake lining means to maintain the latter in light contact with the rotatable disc, said extensible piston comprising a first member having an external thread, said first member having a peripheral portion in sliding contact with the cylinder wall, and a second member having an internal thread surrounding and in threaded engagement with the external thread on said first member, the outer end of said second member engaging said brake lining means, said means for increasing the length of said piston comprising a torsion spring extending between said first and second member and adapted to cause rotation of one of said first and second members relative to the other in one direction in response to wear of said brake lining means.

4. A device for automatically maintaining brake lining means adjacent a rotatable disc comprising a cylinder fixed against rotation, an extensible piston in said cylinder adapted upon outward movement relative to said cylinder to force said brake lining means toward said rotatable disc, and means for increasing the length of said piston in response to wear of said brake lining means to maintain the latter in light contact with the rotatable disc, said extensible piston comprising a first member having an internal thread, said first member having a peripheral portion in sliding contact with the cylinder wall, and a second member having an external thread in threaded engagement with the internal thread of said first member, the outer end of said second member engaging said brake lining means, said means for increasing the length of said piston comprising a torsion spring extending between said first and second member and adapted to cause rotation of one of said first and second members relative to the other in one direction in response to wear of said brake lining means.

References Cited

UNITED STATES PATENTS 3,095,949 7/1963 Butler.
3,255,851 6/1966 Griesenbrock.
3,357,522 12/1967 Bradley et al.

DUANE A. REGER, *Primary Examiner.*

UNITED STATES PATENT OFFICE
CERTIFICATE OF CORRECTION

Patent No. 3,410,373                                  November 12, 1968

John G. Pace

It is certified that error appears in the above identified patent and that said Letters Patent are hereby corrected as shown below:

Column 5, line 5, after "members" insert -- and adapted to cause the rotation of one of said threaded members --.

Signed and sealed this 3rd day of March 1970.

(SEAL)
Attest:

Edward M. Fletcher, Jr.

Attesting Officer

WILLIAM E. SCHUYLER, JR.

Commissioner of Patents